Dec. 17, 1929.  I. ELLIOTT  1,739,892
METHOD OF AND APPARATUS FOR FORMING PRETZELS AND SIMILAR ARTICLES
Filed March 24, 1928
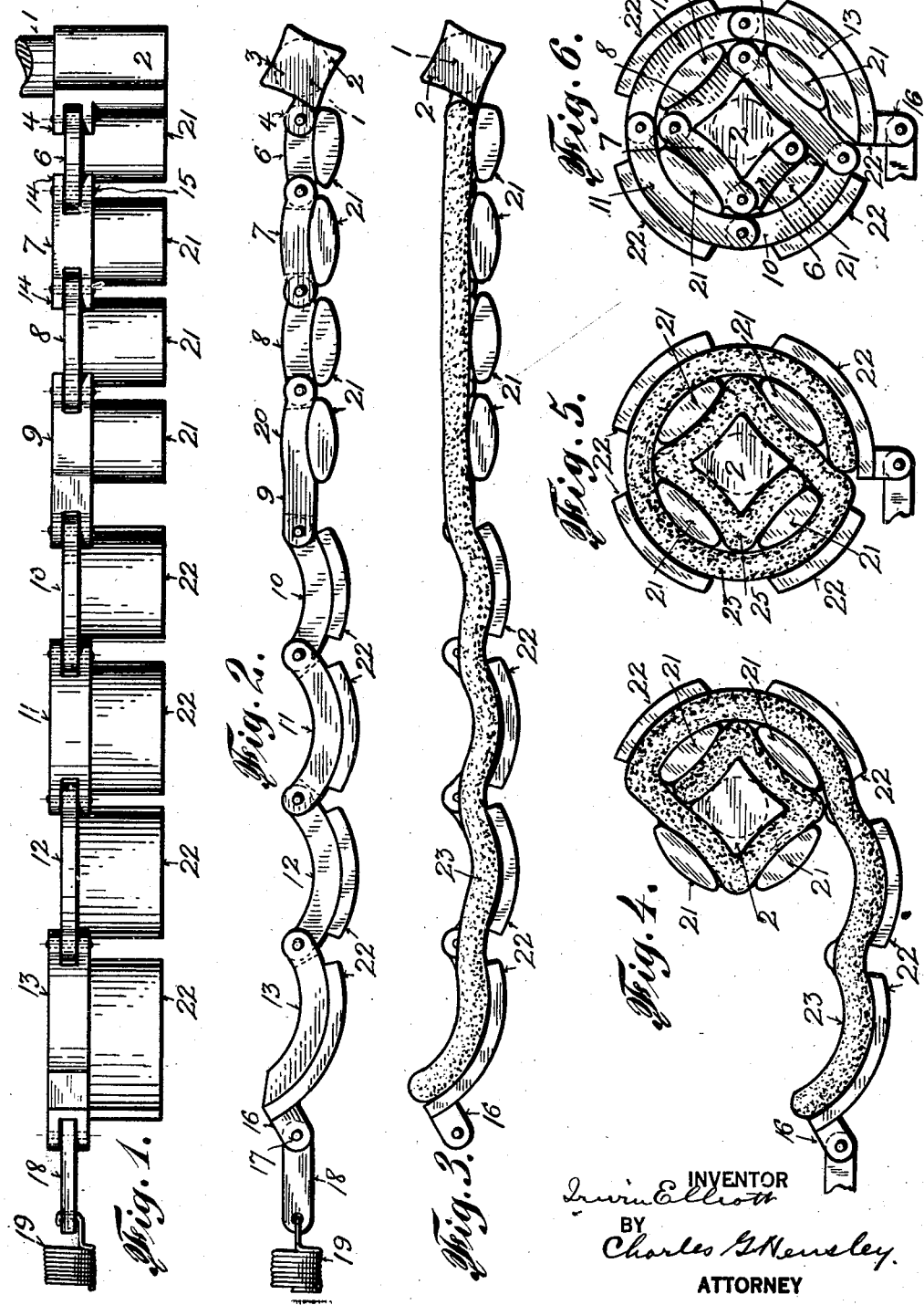
INVENTOR
Irvin Elliott
BY
Charles G. Hensley.
ATTORNEY Patented Dec. 17, 1929

1,739,892

UNITED STATES PATENT OFFICE

IRWIN ELLIOTT, OF NEW YORK, N. Y., ASSIGNOR TO UNIVERSAL OVEN COMPANY, INC., OF NEW YORK, N. Y., A CORPORATION OF NEW YORK

METHOD OF AND APPARATUS FOR FORMING PRETZELS AND SIMILAR ARTICLES

Application filed March 24, 1928. Serial No. 264,359.

My invention relates to a novel method under which strips of dough may be rapidly formed or shaped in the making of pretzels and other articles of food which are formed from a strip of dough. It has heretofore been the practice in the manufacture of such articles as pretzels to take a strip of dough and twist it by hand to form it into the various shapes or configurations. Although operators become very skilled and rapid in the work, nevertheless the cost of forming the articles is a substantial item in the cost of manufacture of the product. In addition, the method is objectionable because it necessitates handling of the dough, which is objectionable from a sanitary standpoint. The object of the present invention is to provide a simple method, as well as a simple device whereby the strips of dough may be very quickly formed into shape, ready for dipping and baking. The present device eliminates all direct handling of the product, simplifies the operation, eliminates the necessity of skilled operators, and it permits the operation to be carried out very rapidly. One advantage of the present device is that many articles may be produced of the same design or pattern, whereas in hand forming there was no uniformity in the design or configuration, other than what might result from the skill of each particular operator. With the present device it is possible to form any number of articles having the same design or configuration, so that a manufacturer may adopt a distinctive design and his product may become recognized and distinguished from products of other manufacturers by reason of the uniform and distinctive design. Various uniform designs may be made by modifying the device, so that various designs may be adopted by the different manufacturers. The present device is very simple and it may be hand operated or it may be incorporated in an automatic machine, but in the present case I have shown merely the device by which the dough may be formed. Other objects and advantages of the invention will be made apparent in the following detailed description.

In the drawing forming part of this application,

Figure 1 is a plan view of an articulated device embodying my invention in the preferred form, Figure 2 is an end elevation thereof, Figure 3 is a similar view showing a strip of dough in position, ready for the forming operation, Figure 4 is a similar view showing the position of the parts during the formation of the product, Figure 5 is a similar view showing the parts at the time the operation is completed, and Figure 6 is an elevation of the device in the same position as in Figure 5 but with the strip of dough omitted.

The essential features of the device consist of an articulated support, preferably in the nature of chain links having projections for receiving the strip of dough and for winding it in the form of a coil upon itself. In the preferred construction the several members of the articulated member or chain are of different length and the several product engaging and folding members are curved in different cross sectional shapes.

In the drawing I shave shown a shaft 1 which may be mounted in any suitable bearings (not shown) and which may be revolved either by hand or mechanical means. On the end of this shaft I have shown a block 2 to which the articulated device is connected, and this block may be given any cross sectional shape to determine the first or interior convolution of the product. The particular shape of block shown herein is substantially rectangular in cross section with its several sides 3 slightly arched or convexed. This block is provided with laterally extending ears 4 to which the first member or link 6 of the articulated device is pivoted by means of a pin 5. The opposite end of the link 6 is pivoted to a second link 7 which has parallel ears 14 to receive the pin 15 by means of which an articulated connection is formed between the first link 6 and the second link 8. In like manner I have shown links 8—13 pivoted one to the other in the same manner as those just described, to form a continuous chain. The endmost link 13 is provided with ears 16 to which is pivoted by the pin 17 a connecting link 18 and the other end of this link is connected with one end of a coiled spring 19 which spring may be of any suitable length, and its opposite end will be connected with some fixed point of connection (not shown). It will be noted that the second link 7 is slightly longer than the first link; whereas the third link 8 is substantially the same length as the second link. The fourth link 9 is slightly longer than the third link; whereas the fifth link 10 is slightly shorter than the fourth link but longer than the third link. The sixth link 11 is slightly longer than the fifth link, and the seventh and eighth links 12, 13 are approximately the same length as the sixth link. In describing the proportions of the device, however, it will be understood that I am merely describing the preferred construction without intending to limit the scope of my invention to any particular proportions or parts. The first three links 6, 7, 8 are shown slightly arched, whereas the fourth one is straight, but is provided with a widened portion 20. The remaining links are all arched in the reverse direction to the first three links. Projecting from and preferably integral with the first four links of the articulate member, are the parallel supports 21 for engaging and supporting the strip of dough. In the particular form illustrated, the supports 21 are oval in cross section, but this is only for the purpose of producing the particular design illustrated in the remaining figures of the drawing, and it is to be understood that a change in the shape of these supporting members will result in a corresponding change in the shape of the product. I have shown these several supports 21 projecting from the under side of the several link members 6—9. Beginning with the fifth link 10 of the articulated member, I have shown supports 22 which are parallel with the supports 21 and these are preferably concavo-convex shaped and conform substantially to the same arc of curvature as the respective chain links from which they project.

When the device is set up for use, the articulate device with the supports will be held in horizontal position supported at one end by the shaft 1 and at the other end by the spring 19. The strip of dough 23 which is to be formed is placed on the several supports, as shown in Figure 3, the strip in this instance representing the material from which a pretzel is to be formed. The shaft 1 is now revolved counterclockwise as in Figure 3 to wind the articulated members around the block 2. The end of the strip of dough is first caught between one of the surfaces 3 of the block 2 and the first supporting member 21 and as the shaft continues to revolve the several chain members are coiled about the block 2 and upon themselves with the strip of dough gripped between the several supports and between the block 2. The revolution of the shaft causes the articulated device to wind up in the manner shown in Figure 4 and with the parts formed in the particular shape illustrated, the strip of dough will first be wound around the block 2 in the form substantially of a rectangle with curved sides, and as the operation continues as shown in Figure 5, a circle 24 is formed of the dough around and enclosing the rectangular portion 25. In this condition the several supports 21 are disposed around the block 2 but spaced from it the thickness or width of the strip of dough. The supporting members 22 are spaced from the inner members 21 the thickness of the strip of dough and co-operate therewith to form the outer ring 24. During this winding operation sufficient tension is exerted on the articulated device by the spring 19 to cause the several parts or links to fold closely around each other and to cause the various supports to bend the strip of dough. The several links of the chain fold upon each other in the manner shown in Figure 6. When the product has been completely formed as shown in Figure 5 the shaft 1, together with the acticulate device held thereon may be inverted to discharge the product endwise off the several supports, after which the shaft 1 is returned to its horizontal position and revolved reversely to the first described movement, so that the spring 19 draws the articulated device back to the position shown in Figures 1 to 3, whereupon it will be ready to receive another strip of dough for a repeat operation.

It will be obvious that the several supporting members 21, 22 which are also the forming members for the dough, may be given various shapes in order to form the product into various patterns or designs; and while I have shown the same adapted for producing one particular design it will be understood that many modifications can be made in the shape of the supporting and forming members to vary the shape of the product. It will be apparent that the folding or forming operations may be performed very rapidly and no skill is required on the part of the operator. The articles formed will be to a large extent uniform in shape, so that a particular manufacturer may adopt a certain design as the distinguishing feature of his product.

The method herein has been described in connection with the operation of the device and it consists broadly of arranging a strip of dough on a plurality of supporting and forming members, and then winding the supporting members upon themselves in substantially helical shape to form the product.

Having described my invention, what I claim is:

1. A device of the class described comprising a support composed of articulated members adapted to be coiled about each other and adapted to engage a strip of dough whereby when said articulated members are coiled upon themselves the strip of dough will be formed into convolutions, a shaft and a member carried thereby with which said articulated device is pivotally connected and around which said articulated device is adapted to be coiled.

2. A device of the class described comprising a support composed of articulated members of different lengths adapted to be coiled about each other, lateral supports projecting from said articulated members and adapted to engage a strip of dough whereby when said articulated members are coiled upon themselves the strip of dough will be formed into convolutions.

3. A device of the class described, comprising a support composed of articulated members adapted to be coiled about each other, lateral supports projecting from said articulated members to engage a strip of dough whereby when said articulated members are coiled about each other the strip of dough will be formed into coils, some of said lateral projections being oval in cross section and others being concavo-convex in cross section.

4. A device of the class described comprising a winding block, a support connected at one end pivotally with said winding block and composed of articulated members of relatively different length adapted to be coiled around said winding block, and lateral supports on said articulated members adapted to engage a strip of dough, said lateral projections being adapted to be held in radially spaced relation by said articulated members when the latter are coiled around said winding block.

5. A device of the class described, comprising a support composed of articulated members adapted to be coiled about each other, means for coiling said support in a plurality of convolutions about itself and lateral projections on said support adapted to engage a strip of dough in a position laterally beyond said support and adapted to wind the strip of dough into coils when said articulated support is wound into a plurality of convolutions.

6. A device of the class described comprising a support composed of articulated members of relatively different lengths between their articulated points adapted to be coiled about each other, means for coiling said support in a plurality of convolutions, and lateral projections on said support adapted to engage a strip of dough and to hold it laterally free of said articulated support and adapted to cause the strip of dough to be coiled upon itself when said articulated support is coiled into convolutions.

7. A device of the class described, comprising a support composed of articulated members adapted to be coiled upon each other, means for coiling said supports in a plurality of convolutions, lateral projections on said articulated members adapted to engage a strip of dough and to support the same laterally beyond said articulated members and adapted to coil the strip of dough in convolutions when said articulated members are coiled upon themselves, said articulated members and said lateral supports being so designed that when the articulated members are coiled upon themselves said lateral supports will be held in radially spaced relation to permit the strip of dough to lie between adjacent lateral supports.

8. A device of the class described, comprising a revolvable member, a support composed of articulated members pivotally connected to each other, a spring drawing on said support, members projecting laterally from said articulated members of said support to engage a strip of dough and adapted to coil the strip of dough into convolutions when said support is coiled upon itself, said revolvable member being adapted to wind said articulated support into convolutions.

9. A device of the class described, comprising a support composed of articulated members pivoted to each other, adapted to be coiled about each other, said articulated members being of relatively different lengths between their pivotal points, lateral projections on said articulated members of relatively different widths in relation to each other, said projections adapted to engage a strip of dough and to support the same laterally of said articulated support whereby when said articulated support is coiled upon itself the strip of dough will be formed by said projections into convolutions.

10. A device of the class described, comprising a support composed of articulated members adapted to be coiled about each other in a plurality of convolutions, lateral projections on the several members of said articulated support arranged below the planes of the pivots of said articulated support when the latter is in distended position, said lateral projections being adapted to engage a strip of dough to support the same laterally beyond said articulated members and said articulated members being adapted to hold said lateral supports in radially spaced relation when said articulated support is coiled upon itself.

Signed at the city, county and State of New York, this 6th day of March, 1928.

IRWIN ELLIOTT.